United States Patent [19]

Wang

[11] Patent Number: 5,400,585
[45] Date of Patent: Mar. 28, 1995

[54] CHAIN STRUCTURE

[75] Inventor: Wen B. Wang, Tainan Hsien, Taiwan, Prov. of China

[73] Assignee: Yaban Chain Ind'l Co., Ltd., Tainan Hsien, Taiwan, Prov. of China

[21] Appl. No.: 246,142

[22] Filed: May 19, 1994

[51] Int. Cl.⁶ .............................................. F16G 13/06
[52] U.S. Cl. .................................... 59/85; 59/4; 59/5; 474/206; 474/220
[58] Field of Search ......................... 59/78, 4, 85, 5; 474/206, 220, 233, 222

[56] References Cited

U.S. PATENT DOCUMENTS

| 586,472 | 7/1897 | Appleby | 54/85 |
| 628,386 | 7/1899 | Berry et al. | 474/20 |
| 891,189 | 6/1908 | Schmidt, Jr. | 59/85 |
| 4,043,215 | 8/1977 | Long et al. | 474/206 |
| 5,178,585 | 1/1993 | Lin et al. | 474/206 |
| 5,186,569 | 2/1993 | Wu | 59/85 |
| 5,291,730 | 3/1994 | Wu | 59/4 |
| 5,299,416 | 4/1994 | Wu | 59/5 |
| 5,305,594 | 4/1994 | Wang | 59/85 |

Primary Examiner—David Jones
Attorney, Agent, or Firm—Morton J. Rosenberg; David I. Klein

[57] ABSTRACT

A chain structure is provided which includes a base plate having a pair of integral cylinders extending from one side. A connecting plate has a pair of elliptically contoured apertures at respective ends adapted to receive the corresponding cylinders. Each of the cylinders has an annular groove formed in a top portion with tapered surfaces. Each of the apertures has a pair of tapered walls at respective sides adapted to matingly engage with the tapered side walls of the connecting plate when the connecting plate is inserted into the base plate and the apertures are aligned in the annular grooves.

1 Claim, 5 Drawing Sheets

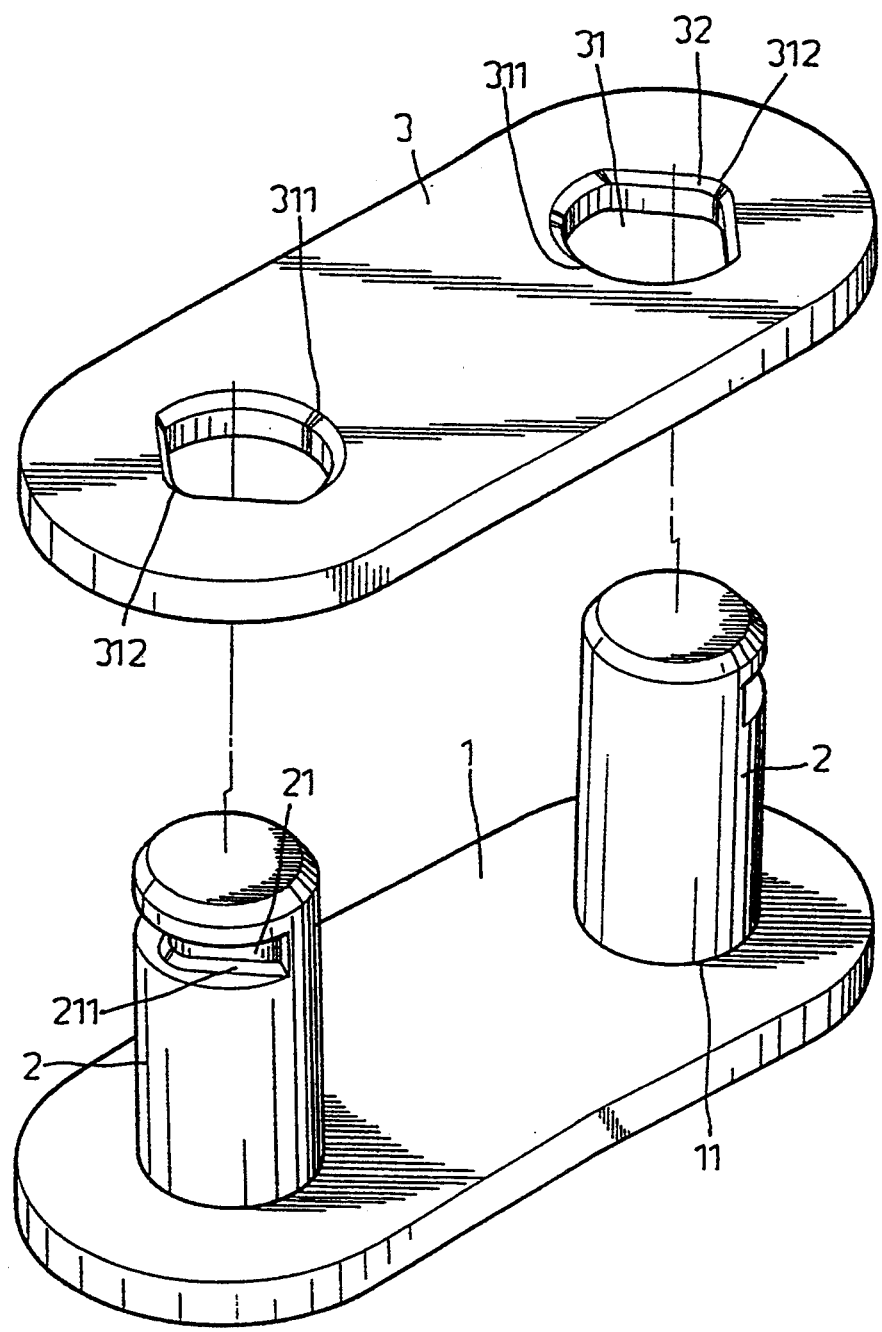
F I G. 1

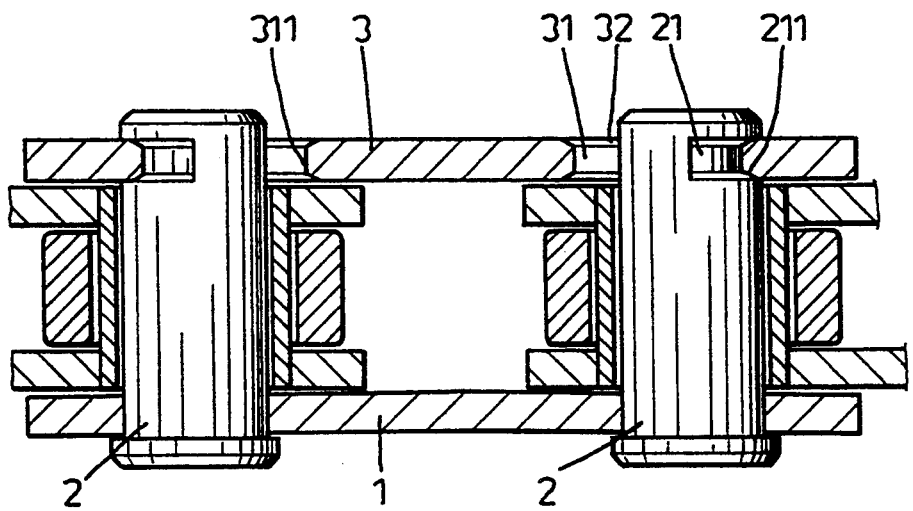
F I G. 2
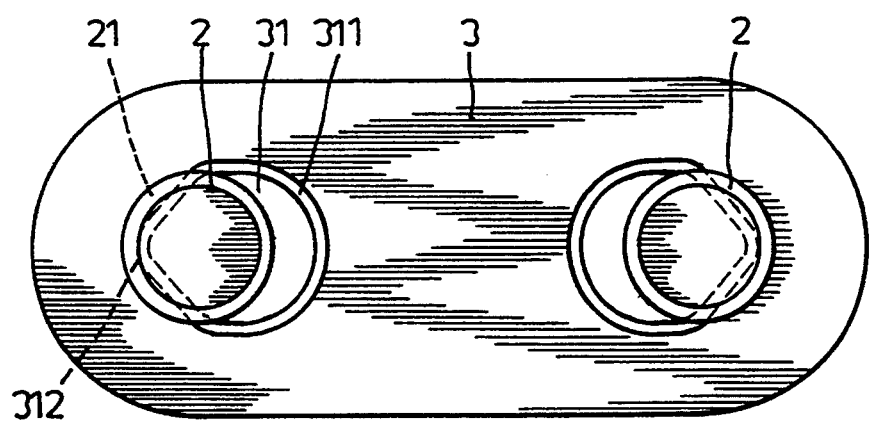
F I G. 3

CHAIN STRUCTURE

FIELD OF THE INVENTION

This invention relates to a chain structure which may be used in conjunction with a freewheeling mechanism of a bicycle or the like vehicle. In particular, this invention pertains to a structure which includes a base plate having cylinder members extending therefrom for coupling to a connecting plate having elliptically contoured openings formed therethrough to provide a secure coupling between the cyclinder members and the connecting plate.

BACKGROUND OF THE PRIOR ART

Freewheeling chains of prior art devices are generally formed by a series of links coupled to each other by connecting plates which form a structure for rotating the wheels through a mechanism which allows for changing the gear ratios. Thus, the connecting plates must have sufficient structural integrity to couple the links, otherwise the chain may snap and possibly lodge itself in the gap between the freewheeling mechanism and the spokes. A prior art structure is shown in FIG. 5, which includes a connecting plate A having a pair of apertures A1 formed therethrough at respective ends. A base plate B is provided having a pair of integral cylinders C at respective ends and in alignment with respective apertures A1. Each aperture A1 includes an overlapping large circular opening and a small circular opening near an outer portion of the connecting plate A. Each cylinder C has an annularly formed groove C1 at an upper section and a knob formed at a respective extremity. Each annular groove C1 has a diameter substantially equal to the diameter of the small circular aperture or opening, while the diameter of the large circular aperture or opening is slightly larger than the outside diameter of the knob so that the cylinder C may be inserted into the large circular aperture until the annular groove B11 is within the large circular aperture. The base plate B is pulled toward the small circular aperture until they snap together and the chain structure is formed.

However, The width of the annular groove C1 is larger than the thickness of the circular apertures which increases wear. The other shortcoming of the prior art, as shown in FIGS. 6 and 7, is that gears D will insert into the gaps between the annular groove C1 and the circular grooves or the chain will skip or jump during pedalling or possibly jump from the chain wheel.

SUMMARY OF THE INVENTION

It is the primary object of the present invention to provide a chain structure which snaps together securely.

It is another object of the present invention to provide a chain structure which will not jump from or skip off a chain wheel when a user is pedalling.

It is a further object of the present invention to provide a chain structure which will not lodge in a gap between a freewheeling mechanism and the spoke.

BRIEF DESCRIPTION OF THE DRAWINGS

FIG. 1 is a perspective view of the subject chain structure in disconnected relation;

FIG. 2 is a cross-sectional elevational view showing a base plate and a connecting plate mounted in operative position on a chain;

FIG. 3 is a top view showing a part of cylinders being inserted into respective apertures of a connecting plate and slided to the outer portions of the apertures respectively.

DESCRIPTION OF THE PREFERRED EMBODIMENTS

Figure 4:
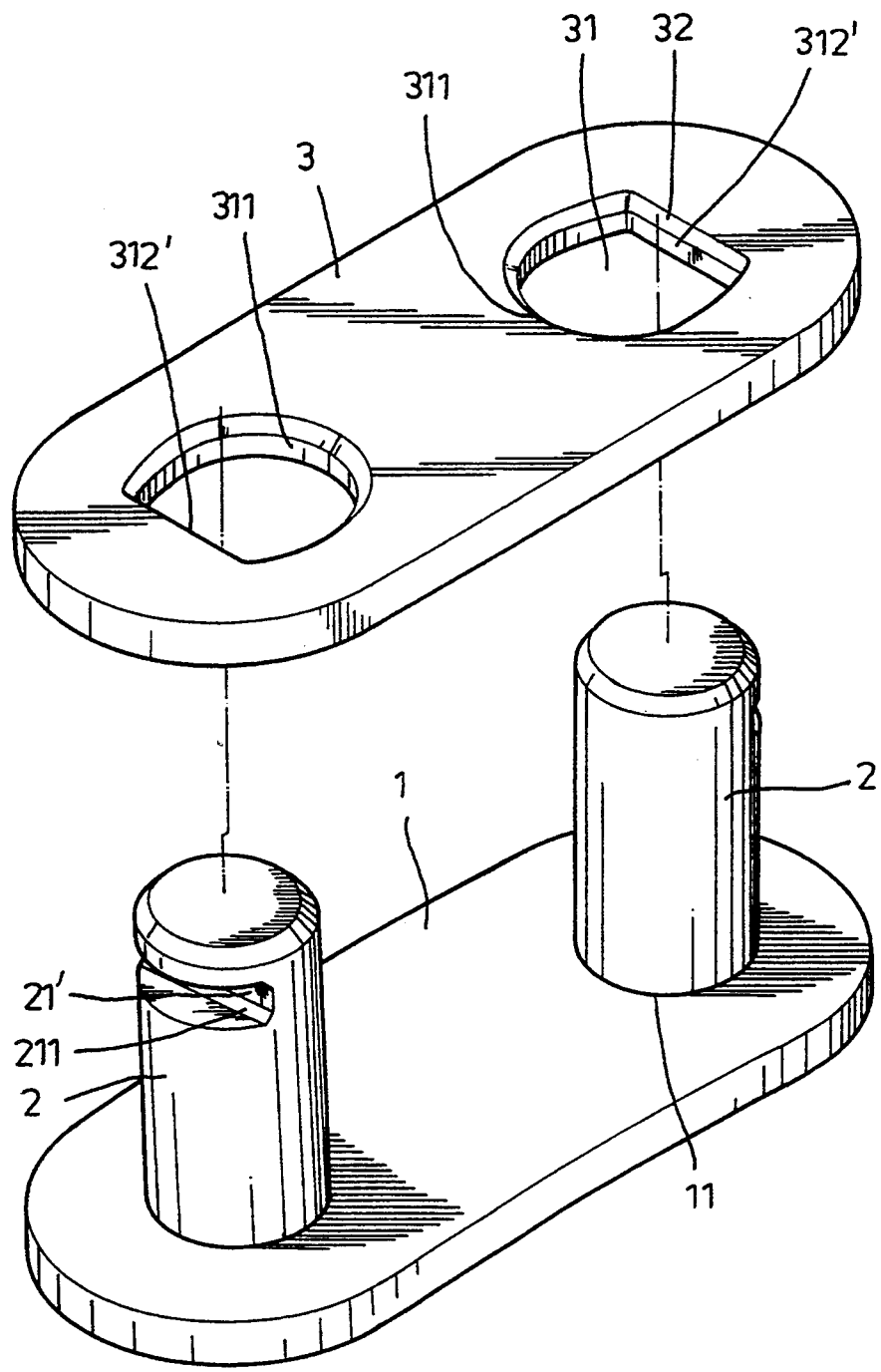
FIG. 4 is a second embodiment of the present invention in disconnected relation.
Figure 5:
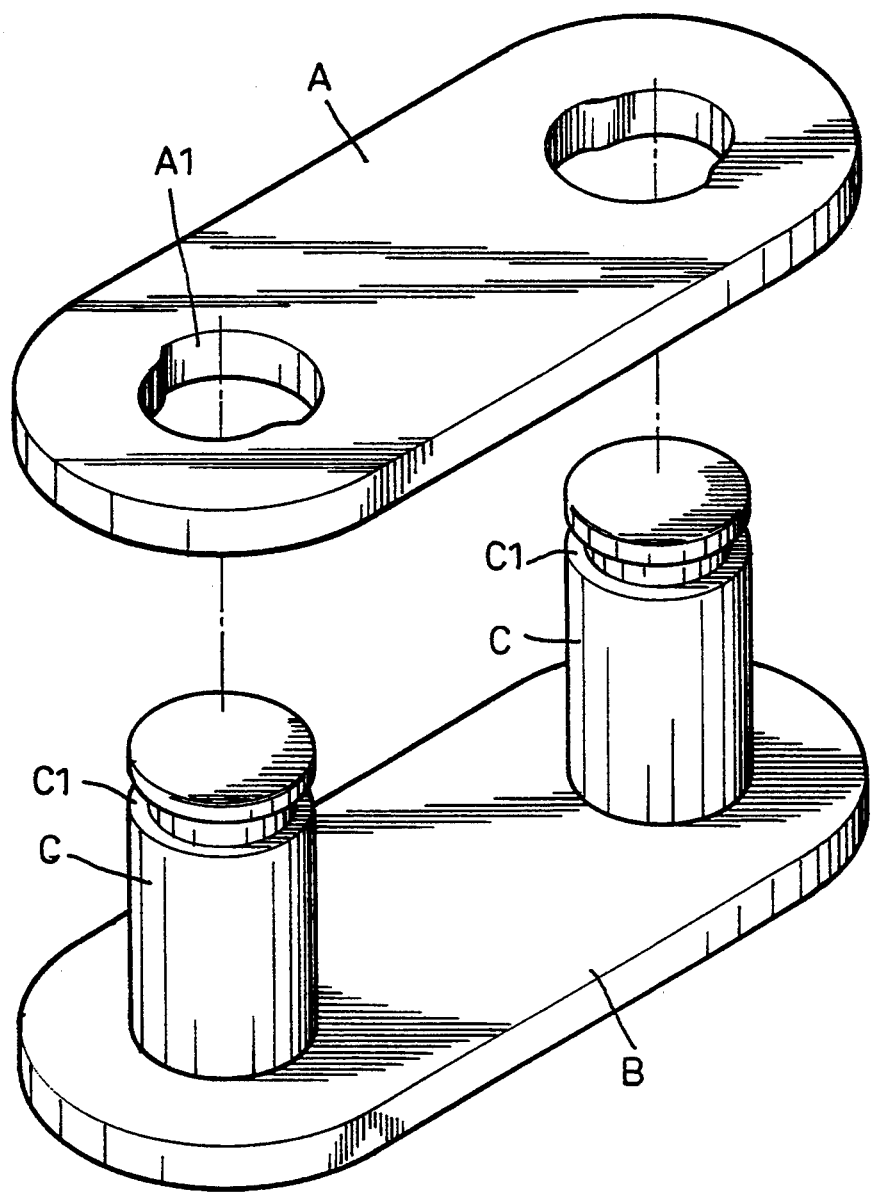
FIG. 5 is a perspective view of a chain of prior art in disconnected relation.
Figure 6:
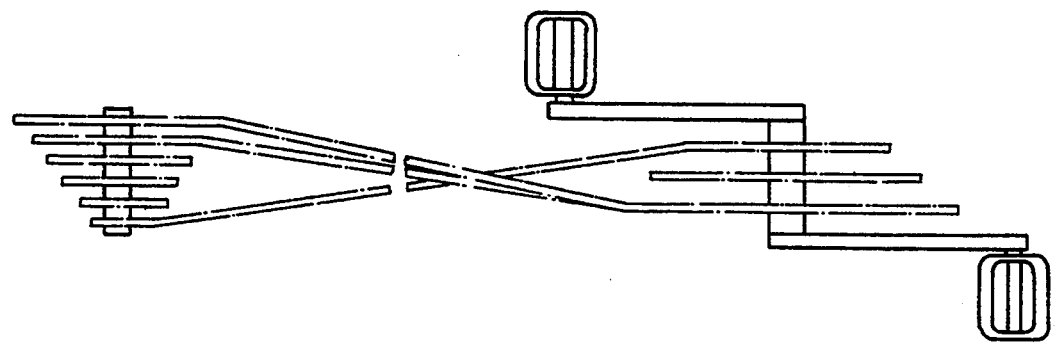
FIG. 6 is a top plan view depicting a prior art chain application.
Figure 7:
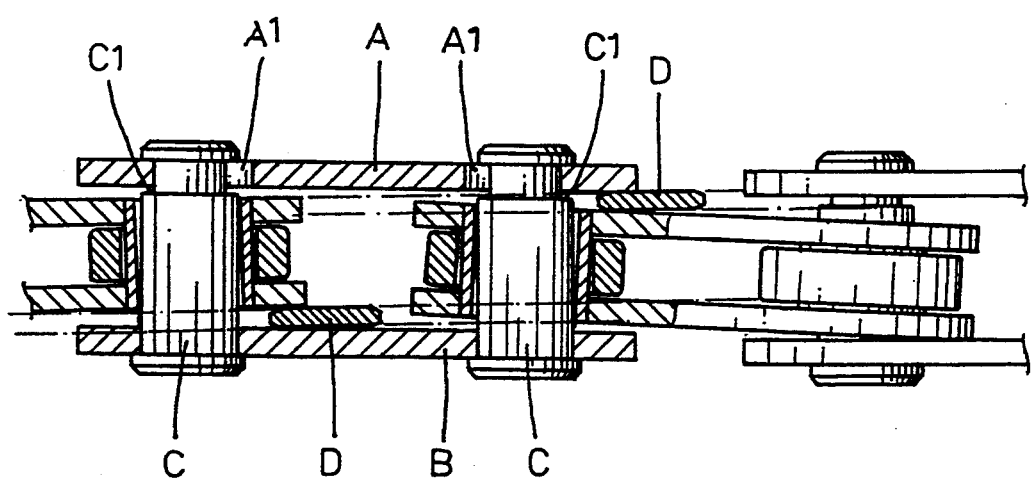
FIG. 7 is an enlarged bottom view of a FIG. 5, partially sectioned.

Referring now to the drawings wherein the showings are for the purpose of illustrating the preferred embodiments only and not for the purpose of limiting the inventive concept. FIG. 1 shows the present invention as being composed of a connecting plate 3 and a base plate 1 forming the present invention structure.

The base plate 1 has a pair of integral cylinder 2 extending upwardly from respective ends and having V-shaped cavities 21 facing outwardly respectively. A pair of tapered or inclined surfaces 211 are formed at the upper and the lower portions of the cylinders 2.

The connecting plate 3 has a pair of irregular round contoured apertures 31 formed therethrough and positioned at respective ends of the connecting plate 3. Each of the apertures 31 has a V-shaped end 312 formed to the outer end internal to the aperture 31 with the end point facing outwardly and a larger radius 311 at a respective inner end.

In order to assemble the present invention, the cylinders 2 are inserted through apertures 31 of two base plates 1 with one cylinder 2 through an aperture 31 of one base plate 1 and the other cylinder 2 through an aperture 31 of the other base plate 1, as shown in FIG. 2. Each cylinder 2 is inserted into the inside portion of the aperture 31 until the surface 211 is adjacent a wall surface of a respective aperture 31. The connecting plate 3 is then pulled until the end point of the V-shaped end 312 snaps into the taper 211 of the base plate 1, as shown in FIG. 3. The other aperture 31 at this time is facing the other cylinder 2 of the base plate 1. The connecting plate 3 is pressed downwardly until the aperture 31 aligns with the annular groove 211. The connecting plate 3 is pulled outwardly, allowing both surfaces 312 to engage with the surface 211 to complete the assembly.

FIG. 4 shows another embodiment of the present invention where the V-shaped end 312 of the apertures 31 are replaced with planar surfaces 312' and the V-shaped cavities 21' are replaced with horizontally flat surfaces 21' which correspond to the planar surfaces 312' of the apertures 2.

I claim:

1. A chain having a series of base plates and connecting plates, each base plate having a pair of cylinders extending upwardly at respective ends thereof and the improvement comprising:

each of said cylinder members being coupled to said base plate member at a lower section thereof and having a groove formed in an upper section thereof forming a pair of opposing cylinder groove walls, at least one of said cylinder groove walls being tapered or inclined; and, said connecting plate member being coupled to said cylinder members and having a pair of opposing outer ends, said connecting plate member having a pair of irregular round contoured apertures formed therethrough, each of said irregular round contoured apertures having a V-shaped end formed internal to said aperture, each of said apertures having an end point of said V-shaped end being directed toward a respective one of said opposing outer ends of said connecting plate and a larger radius end directed away therefrom, each of said irregular round contoured apertures defining an inner wall having an inclined or tapered surface for mating engagement with a respective inclined cylinder groove wall.

* * * * *